March 6, 1962
A. B. PARROTT
3,024,351
ELECTRIC WELDER
Filed Aug. 19, 1959
4 Sheets-Sheet 1
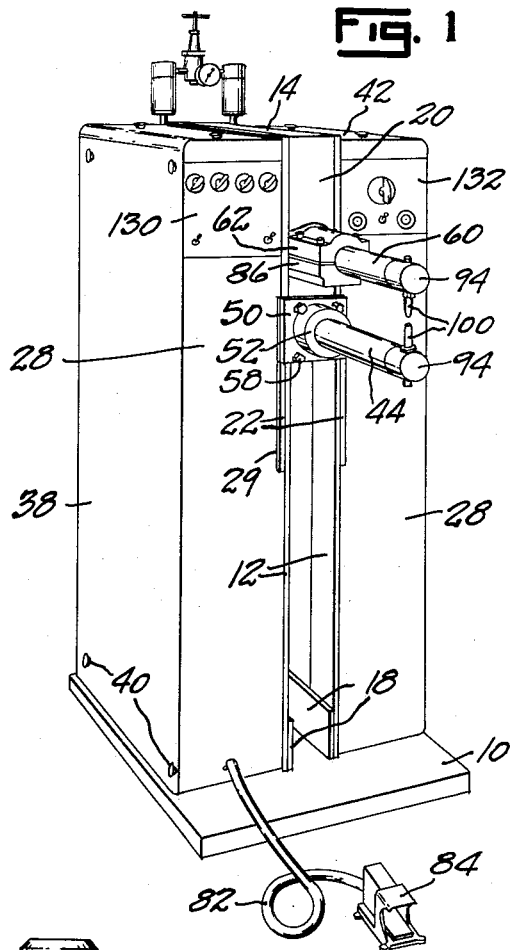
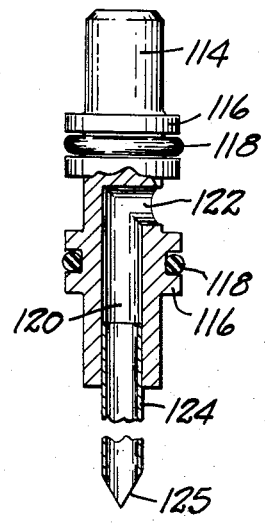
INVENTOR.
ALTON B. PARROTT
BY
Eugene C. Knoblock
ATTORNEY

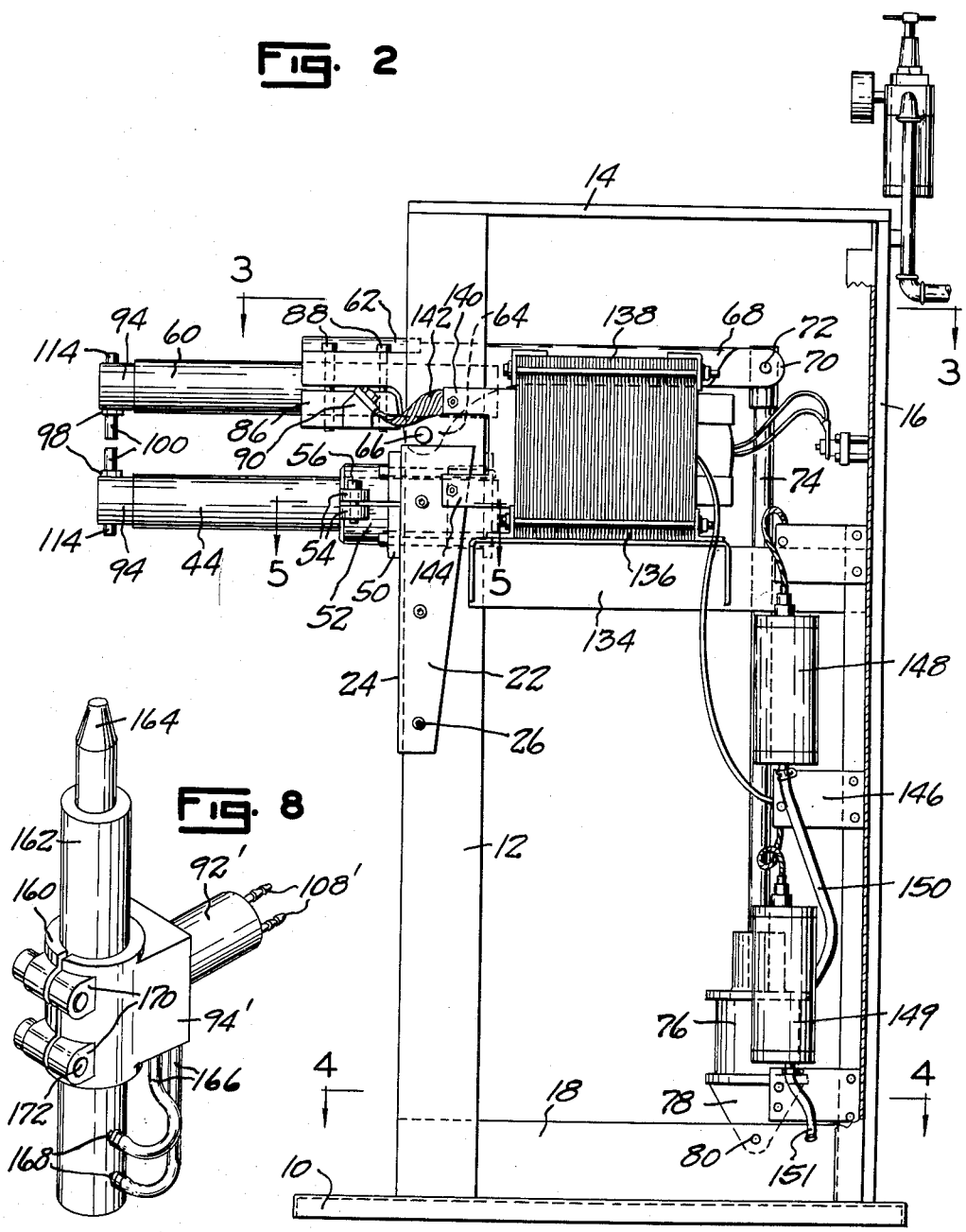

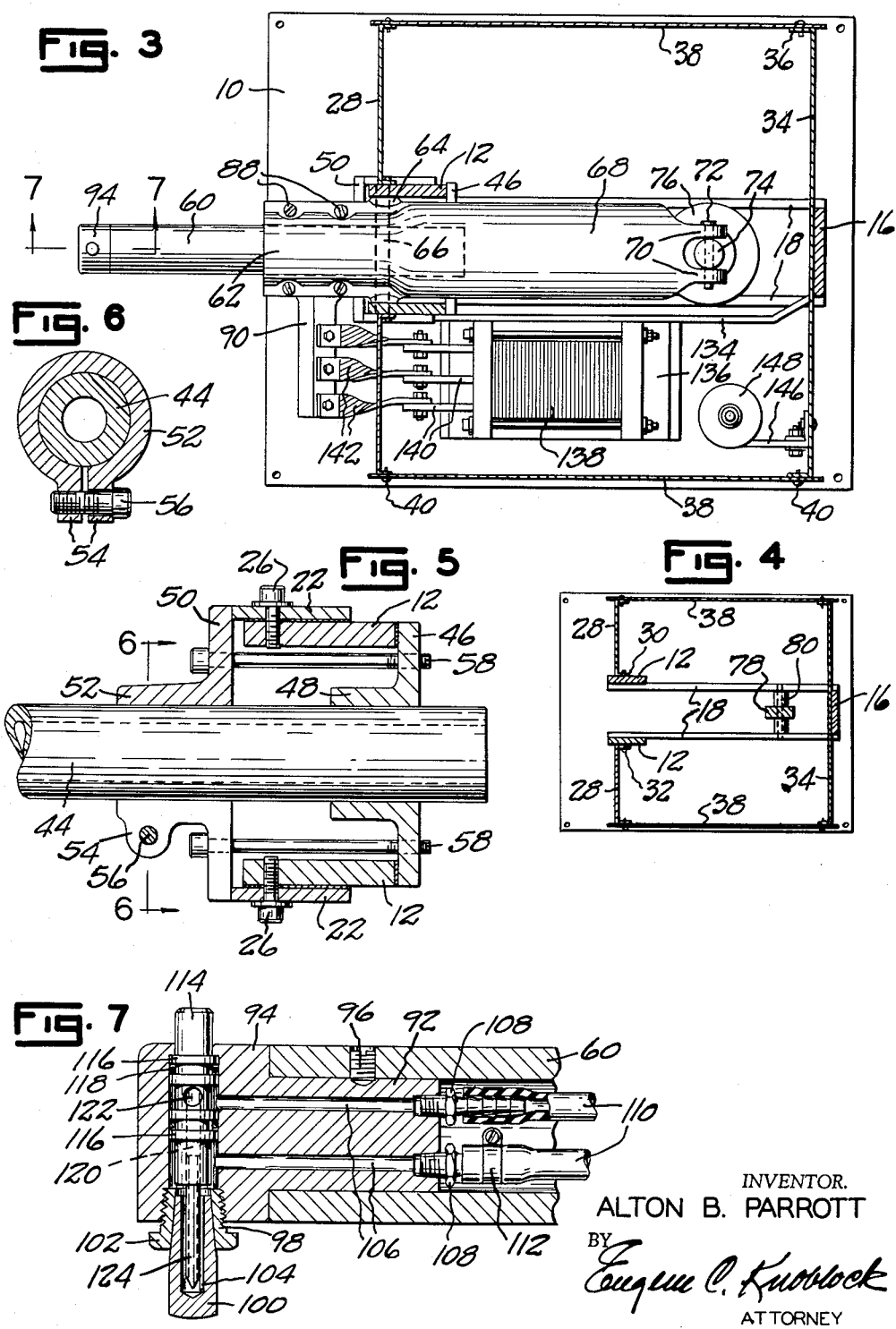

INVENTOR.
ALTON B. PARROTT
BY
Eugene C. Knoblock
ATTORNEY

United States Patent Office 3,024,351
Patented Mar. 6, 1962

3,024,351
ELECTRIC WELDER
Alton B. Parrott, 1200 Milton St., Benton Harbor, Mich.
Filed Aug. 19, 1959, Ser. No. 834,826
10 Claims. (Cl. 219—86)

This invention relates to improvements in electric welders.

The primary object of this invention is to provide a device of this character having a strong stress-sustaining skeleton frame capable of sustaining pressures applied during welding with minimum distortion and removably supporting closure members to facilitate access to parts within the housing for maintenance, adjustment and replacement.

A further object is to provide a device of this character having welding horns or arms mounted for horizontal adjustment to accommodate change of the throat of the machine without necessity of replacing horns or arms with ones designed for a particular throat dimension and while retaining high operating efficiency of the device.

A further object is to provide a device of this character having a skeletal frame mounting welding horns or arms and supporting a welding transformer located laterally with respect to the welding horns to accommodate horizontal adjustment of those arms for variation of the throat dimension of the device without decreasing the power factor of the device in such a manner as to render the device more accessible for repairs, replacements and connection changes than conventional prior electric welders.

A further object is to provide a device of this character having a novel strong supporting mechanism for a stationary lower welding horn or arm, consisting of a pair of horizontally spaced members anchored in selected vertical adjustment upon a multiple part upright element of a skeleton frame to support the horn at longitudinally spaced points thereof in selected longitudinally projected position in a manner providing clearance therearound for access thereto and strong support therefor with minimum deflection without the need for separate bracing elements.

A further object is to provide a device of this character having novel welding arms or horns of hollow construction open at their inner ends to accommodate water hoses extending to electrode holders carried by the outer ends of the horns at which cooling action is desired, said horns having inner and outer diameters selected to minimize the resistance thereof to alternating current flow therethrough.

A further object is to provide a device of this character having novel electrode holders mounted upon welding horns or arms and characterized by short length to accommodate application thereover of an article having a comparatively small interior cavity and thereby accommodating the use of the device for the welding of articles of smaller size than could be successfully welded by prior constructions, said holders each detachably mounting an electrtode and a liquid-flow-directing member constituting an ejector projecting at the opposite side of the holder from the electrode and accommodating release of an electrode by tapping upon the end of the ejector.

A further object is to provide a device of this character having an ignitron tube mount of novel design accommodating the location of ignitron tubes one above another in a simple installation and with a simple connection of the water lines to said tubes to accommodate complete drainage of water in both tubes easily and quickly to prevent freezing while in transit or in storage.

Other objects will be apparent from the following specification.

In the drawings:

FIG. 1 is a front perspective view of my new construction of electric welder;

FIG. 2 is a view of the welder in side elevation with parts broken away;

FIG. 3 is a horizontal sectional view taken on line 3—3 of FIG. 2;

FIG. 4 is a horizontal sectional view taken on line 4—4 of FIG. 2;

FIG. 5 is an enlarged fragmentary detail sectional view taken on line 5—5 of FIG. 2;

FIG. 6 is a transverse sectional view taken on line 6—6 of FIG. 5;

FIG. 7 is a fragmentary detail sectional view taken on line 7—7 of FIG. 3;

FIG. 8 is a perspective view of a modified construction of electrode and holder;

FIG. 9 is a side view of electrode ejector and water flow-directing means used in the construction shown in FIG. 7;

Figures 10, 11:
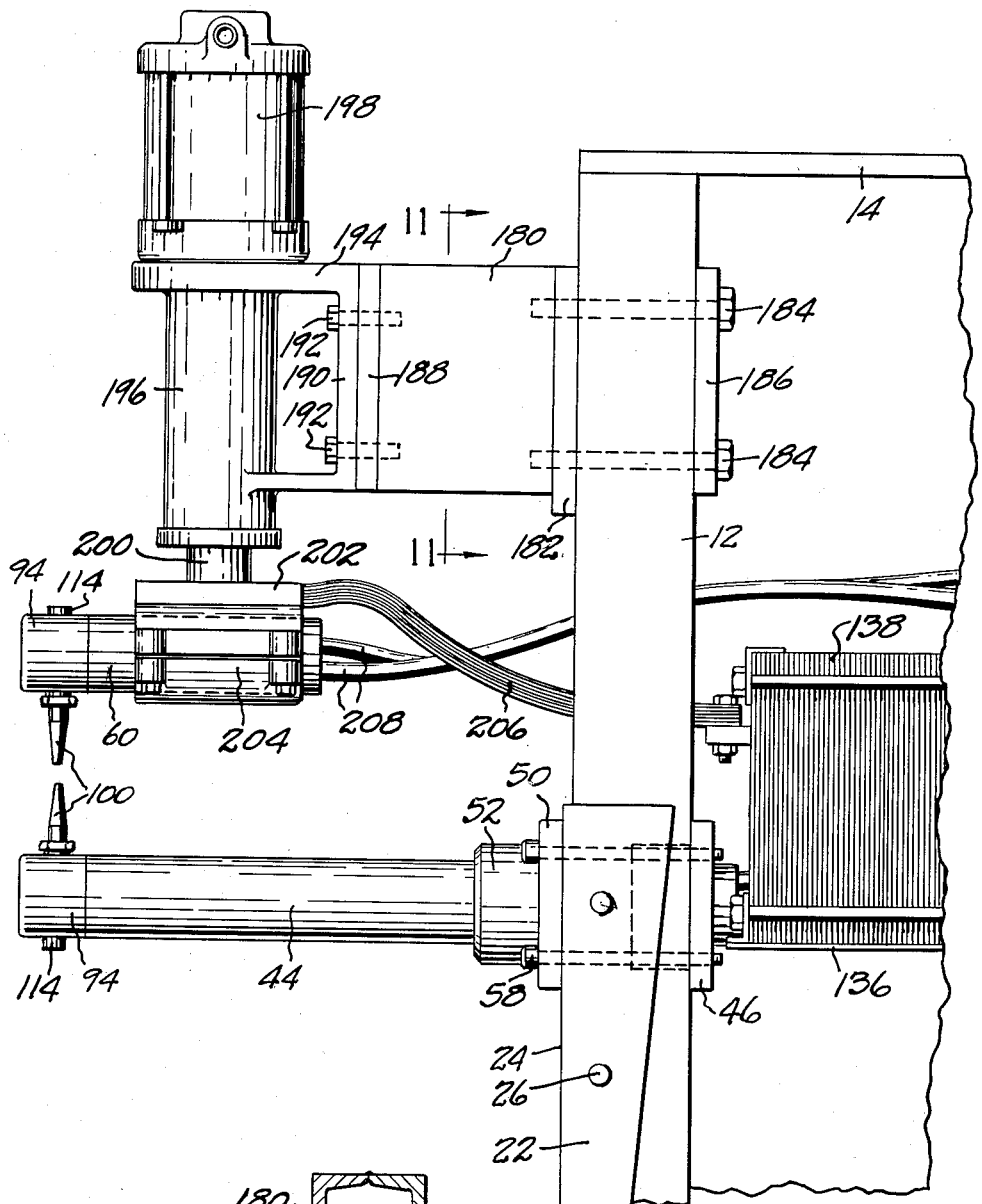
FIG. 10 is a fragmentary side view of the welder of the press type with the housing removed from the frame.
FIG. 11 is a transverse sectional view taken on line 11—11 of FIG. 10.

Referring to the drawings which illustrate the preferred embodiment of the invention, the numeral 10 designates a base which forms a part of and supports a skeleton frame. The skeleton frame includes a pair of spaced, rigid, upright, substantially parallel front frame members 12, preferably formed of rigid plate stock. A top rigid frame member 14 is secured at its forward end to uprights 12 and extends rearwardly therefrom for support at its rear end by a rear rigid upright member 16 carried by the base 10. The lower ends of the uprights 12 and 16 are interconnected by lower frame or bracing members 18. The frame members 12, 14, 16 and 18 are rigidly secured together and to the base 10 by welding or suitable securing means (not shown) and cooperate to define to define a stress-sustaining unit strong enough to sustain all stresses applied to the device during use thereof and capable of supporting the constituent parts of the welding apparatus. If desired, a front plate portion 20 may interconnect the upper ends of the front upright frame members 12, as seen in FIG. 1. The uprights 12 preferably mount elongated guide plates 22 having parallel front edges 24 projecting from the front edges of the upright frame members 12. Guide plates 22 are secured to the frame uprights 12 in any suitable manner, as by means of cap screws 26, and preferably are electrically insulated from members 12. Plates 22 extend for only a portion of the length of the upright members 12, being spaced below the front frame part 20 and above the lower frame parts 18.

The skeleton frame serves as a support for mounting parts defining a casing or housing. The casing or housing parts preferably include a pair of front panels 28, each having marginal vertical flanges 30 including a flange at its inner edge accommodating bolts 32 or other securing means for anchoring each panel at its inner edge to the adjacent upright frame member 12. A rear panel 34 is secured to the rear upright frame member 16 and preferably has vertical marginal flanges 36. Side panels 38 are detachably secured to the vertical marginal flanges of the front and rear panels 28 and 34 by means of detachable securing means, such as screws or cap screws 40. The side panels 38 preferably include an angular inturned top-forming part 42 extending into abutment or adjacent relation to the top skeleton frame member 14 to complete the enclosure of the device. The front panels 28 will preferably be cut away at 29 adjacent to the guide members 22, as seen in FIG. 1.

An elongated rigid lower horn or arm 44, preferably of uniform tubular construction, is mounted in selected position upon the skeleton frame to project horizontally and forwardly from the device at the center thereof and between the upright frame members 12. A rear arm-supporting fitting is provided with a flat plate portion 46 spanning the rear edges of the front spaced skeleton frame members 12 and electrically insulated therefrom. This fitting has a central tubular or socket portion 48 whose inner diameter is such as to receive an arm or horn 44 with a snug fit. A front arm-supporting fitting comprises a base plate 50 of a size to span and bear flat against the front projecting edges 24 of the guides 22. This fitting has a split collar 52 projecting forwardly therefrom to receive and support the lower arm or horn 44 in spaced relation to the rear fitting. Ears 54 project from the fitting sleeve 52 at opposite sides of the split thereof and a cap screw or other securing means 56 is employed to draw the ears 54 together for firm clamping engagement of the split fitting sleeve 52 with the lower arm or horn 44. The plates 46 and 50 of the two fittings have registering openings therein, with the openings in the plate 46 of the rear fitting preferably being screw-threaded so as to receive the screw-threaded shank portions 58 of cap screws which can be tightened to draw the plates 46 and 50 into firm frictional supporting anchored position upon the front portions of the upright frame members 12 at any selected elevation, engaging guide plates 22 but electrically insulated from frame members 12.

It will be observed that the maximum cross-sectional dimension of the front skeleton frame members 12 extends fore and aft, i.e., in a direction parallel to the length of the lower arm or horn 44 and to the cap screws 58 so that stresses applied to said lower arm 44 at its free end in a downward direction are resisted by the major cross-sectional dimension of the frame members 12. Similarly, the disposition of the upright front skeleton frame members 12 with their major cross-sectional dimension extending fore and aft spaces the sockets of the fitting members at which the elongated rigid lower arm or horn is supported so that the construction serves to minimize the deflection of the lower arm under pressure without requiring the use of braces therewith.

An elongated rigid upper welding arm or horn 60, preferably of tubular construction, is mounted upon a pivoted clamping bracket or lever. The pivoted bracket preferably has a jaw portion 62 whose lower surface is provided with a longitudinal arm-receiving and clamping groove. A pair of downwardly projecting ears or lugs 64 are formed intermediate the length of the bracket and accommodate a pivot pin 66 therethrough and through aligned apertures in the spaced front upright skeleton frame members 12. The rear portion 68 of the bracket is elongated and extends into the housing where it terminates in a bifurcated end portion 70 whose fork portions have aligned apertures therein to receive a pivot pin 72 for pivotally connecting thereto the upper end of an elongated actuating rod or member 74.

Any suitable means may be employed to pivot the bracket lever 62, 68 by vertical movement of the actuator 74 and, as here shown, fluid pressure actuated means may be employed, including a cylinder 76 slidably receiving therein a piston (not shown) which is connected to the actuator 74. The cylinder 76 has a bracket 78 which is pivotally connected at 80 to the lower skeleton frame members 18. The cylinder 76 will be connected by suitable conduits (not shown) with a source of fluid under pressure and by conduit 82 with a suitable control 84, such as a foot-operated member, as seen in FIG. 1. The control means serves to control the flow of fluid under pressure to and from cylinder 76 for the purpose of pivoting the bracket lever 62, 68 and the upper horn or arm 60 in a vertical plane between work-clamping and work-releasing positions. It will be understood, however, that any other type of means for shifting the member 74, such as a conventional foot treadle, a hand-operated lever, or the like, may be provided in place of a power-actuated unit.

The bracket for mounting the upper arm or horn 60 is completed by a lower jaw member 86, preferably longitudinally elongated and having a longitudinal groove of arcuate cross-section in its top face snugly receiving the lower portion of the upper arm or horn 60. A plurality of securing members, such as cap screws 88, releasably interconnect the clamping bracket jaws 62 and 86 to firmly position the upper arm or horn 60 therein at selected longitudinal adjustment, that is, to project the desired extent forwardly from the housing. The lower jaw 86 preferably includes an elongated laterally projecting portion 90, for purposes to be described.

Each of the arms or horns 44 and 60 mounts an electrode holder, preferably of the construction best illustrated in FIGS. 7 and 9. The electrode holder has an elongated stem portion 92 of circular cross-section having a snug fit in the end of the tubular arm or horn on which it is mounted and an enlarged projecting end portion 94, preferably cylindrical as seen in FIG. 1, and concentric with the arm or horn on which it is mounted. The portion 92 of each holder is suitably anchored to the tubular supporting arm, as by means of a set screw 96, as shown in FIG. 7. A transverse bore extends through the large diameter projecting end portion 94 of the holder and terminates in an enlarged tapered threaded socket portion within which is screw-threaded a tapered collet or clamp member 98 having a tapered bore receiving and mounting the tapered end of an elongated electrode 100, said collet preferably having an enlarged configured tool accommodating head 102. The electrode preferably has an axial bore 104 in its tapered end and terminating spaced from its opposite end.

The electrode holders may be provided with means for circulating cooling water therein. Thus, as seen in FIG. 7, the stem part 92 projecting into the free end of the tubular arm or horn may have a pair of elongated bores 106 formed therein which open at the inner end face of stem part 92 and communicate with the electrode-receiving bore. Each of the passages 106 preferably has an enlarged end portion to receive a fitting 108 to which may be connected a water conduit 110 in any suitable manner, as by means of a clamp 112. It will be understood that the conduits or tubes 110 will preferably be flexible and will project from the inner open end of the tubular arm or horn and thence through the housing to a source of water supply (not shown).

An ejector member or pin 114, best seen in FIG. 9, has a pair of lands 116 of increased diameter spaced longitudinally thereof and each circumferentially grooved to receive an O-ring or other annular resilient seal 118 having a snug fit in the electrode-receiving bore. An axial passage 120 is formed in the inner end of the bore and terminates in a lateral portion 122 opening between the lands 116. The innermost land is positioned between the two passages 106 so that one of said passages communicates with the opening 122 between the lands and the other passage communicates with the space around the inner end of the ejector 114. A tube 124 is carried by the ejector 114 coaxially with the bore 120 and projects therefrom to extend into the bore 104 of the electrode with clearance. The end of the tube 124 is preferably beveled at 125 so as to permit flow of water between the tube 124 and the electrode bore 104.

Thus it will be seen that water may flow through one of the tubes 110, such as the upper tube, thence into the upper bore 106, thence into the bore 120, 122 of the ejector 114 and through the communicating tube 124 into the bore 104 of the electrode 100, at which point the direction of flow reverses and water discharges from the electrode bore 100 into the cross-bore of the electrode holder around the innermost end of the ejector for flow to the lowermost passage 106 and thence to the lowermost tube 110. By this means cooling is effected constantly and effectively at the electrodes and a positive seal against leakage of water in the system is provided. The ejector 114 is freely shiftable in the bore of the electrode holder so that, if the electrode should become stuck in the holder after release of the anchor member 98, a simple tap upon the end thereof will serve to dislodge the electrode.

The usual electrical components of the welder are mounted within or upon the housing and may include control panels 130 and 132 at the front of the housing, each mounting suitable control elements of the character well understood in the art and including switches and timers. A bracket member 134 is positioned within the housing in laterally spaced relation to the lever 68 and is fixedly anchored at its opposite ends to the front and rear frame parts in any suitable manner. The bracket 134 will preferably include a platform 136 upon which is mounted the usual welding transformer 138. The transformer 138 has terminals 140 connected by conductors 142 with the laterally projecting portions 90 of the clamp bracket mounting the upper arm or horn 60 and has terminals 144 connected to guide plates 22. Adjacent to the transformer is positioned one or more brackets 146 for supporting a pair of ignitron tubes 148, 149 in vetrically spaced relation. The ignitron tubes will be interconnected by a water conduit 150 connecting the bottom portion of the water jacket (not shown) of the upper tube 148 with an upper portion of the water jacket of the lower tube 149. The outlet 151 of the lower tube 149 will preferably be at the bottom thereof to facilitate draining thereof. The arrangement will be such that drainage of the lower tube will automatically accommodate drainage of the upper tube. The ignitron tubes will be electrically connected in a circuit including the transformer 138 and the other usual electrical components of an electrical welder, such as timers and switches (not shown), in the manner well understood in the art.

It will be understood that all operative parts and stress-bearing parts of the device are supported by the skeleton framework consisting of the base 10 and frame parts 12, 14, 16 and 18. Consequently, the panels secured to the framework to define the housing are free of stress and can be made of light gauge sheet metal and readily mounted and demounted without interfering with proper functioning of the parts or with the stressing of the unit. This facilitates access to all operative parts upon removal of housing panels, facilitates initial assembly of the apparatus, and facilitates the wiring of the apparatus. The construction represents a substantial improvement over prior welder constructions wherein the housing constituted the frame of the apparatus which had to be made strong enough to withstand mechanical forces involved and still had to provide for access to the interior components of the apparatus.

The clamping of the horns or arms to accommodate endwise horizontal adjustment to faciliate changing of the throat of the machine is a distinct advantage in machines of this type since it eliminates the necessity for substituting longer or shorter horns or arms whenever a change in throat dimension is desired. Ordinarily, the welding capacity of a spot welder increases as the thoat is decreased and, therefore, adjustability of the throat without change of the horn or arms adds considerably to the flexibility of the apparatus. The throat adjustment requires the location of the transformer to one side of the housing, whereas such transformers usually are located directly behind the horn. The use of the unified frame construction makes possible this side mounting of the transformer and does so without decreasing the power factor of the machine. The lateral positioning of the transformer additionally renders the transformer more accessible for repairs or replacements or connection changes when the housing panel is removed.

The support of the lower horn or arm for fixed mounting on the frame in any selected vertical adjustment, as well as any selected endwise adjustment, while providing firm anchorage in the selected position, is of great importance. In conventional welding apparatus the lower horn is usually supported by a casting which is bolted or clamped to the front of the machine so as to provide a cantilever type of support. This cantilever mounting necessitates the use of a gusset or other form of brace which has here been eliminated. The use of the front and rear fittings spanning and extending between the front frame members 12 distributes the stress imposed upon the lower arm and eliminates the need for either fitting casting serving as a cantilever. The arrangement insures a strong lower horn with minimum deflection.

The provision of tubular or hollow horns which receive the cooling lines leading to the welding electrode holders reduces the exposure of projecting parts which would tend to interfere with efficient functioning of the machine and its usage. In conventional spot welders the water hoses to and from the electrode holders usually dangle from the welder frame to the electrode holders and, hence, are exposed to injury and tend to interfere with the ready application of work pieces to the welder and the manipulation of the work pieces upon the welder. It will be seen that even though the conduits are concealed and protected in the present construction, they are readily accessible for repair or replacement either by access through a panel to the interior of the housing or by removing the electrode holders from the horns and pulling the conduits forwardly through the horns if access to the connection of the conduit to the electrode holders is required.

The electrode holders of the machine are novel and allow the firm anchorage of electrodes of comparatively short length. Thus in the construction illustrated in FIG. 7, it is possible to provide a minimum clearance over the electrode holders of three inches, thus permitting an operator to slide a tube or small box over the holder and horn for welding. Conventional types of electrode holders are from six inches to eighteen inches long and they are clamped at right angles to the horns, thus greatly limiting the size of a box or tube which can be slipped over the horn for welding. The construction of the electrode holders which entails the location of the water inlet and outlet for the cooling system within the stem which fits inside the hollow horn is important as means to provide concealment of water connections and elimination of exposed hoses. The provision of an ejector allows easy removal of the electrodes by tapping the ejector located on the opposite side of the holder from the electrode.

A modified construction of electrode holder capable of mounting long electrodes and taking advantage of the tubular horns to conceal water or cooling lines and to minimize interference by water lines with the work is illustrated in FIG. 8. In this construction the electrode holder has a cylindrical portion 92' adapted for snug fit in the outer end of a tubular horn, and a comparatively large diameter head 94' projects therefrom and externally of the mounting horn or arm. The head 94' is preferably provided with a split tubular or socket portion 160 which mounts a conventional elongated tubular member 162 from one of which projects electrode tip 164. A pair of hose connecting fittings 108' are carried by the reduced neck portion 92' and communicate with passages therethrough which extend into the head 94' and with which are respectively connected short conduits 166 whose opposite ends are connected with fittings 168 carried by the member 162. It will be understood that the member 162 has a flow passage therethrough for cooling the electrodes and so arranged that one of the conduits 166 will constitute an inlet and the other will constitute an outlet from the flow passage in part 162. The split socket portion 160 of the head 94' will preferably have ears 170 located at opposite sides of the split, which ears are drawn together by drawbolts or cap screws 172 for the purpose of firmly clamping the electrode assembly 162, 164 in desired position. It will be observed that water lines may be connected at fittings 108' after extending through the tubular horn and that the only conduits which are exposed adjacent to the work are the short conduits 166 which can be so located as to present minimum interference to operation of the device.

In the embodiment of the invention illustrated in FIGS. 10 and 11, an air-operated press type spot welder is shown, and parts shown therein which are similar to the parts shown in FIGS. 1 and 2 bear the same reference numerals. In this construction a rigid beam 180, which may be of the box section in cross-section illustrated in FIG. 11 formed by welding two channels together, is fixedly secured to the front frame members 12 in a manner similar to the fixed securement of the members which support the lower horn 44. Thus at its rear end the member 180 may be provided with a cross-plate 182 provided with a plurality of screw-threaded apertures therein to receive the screw-threaded shanks of cap screws 184 whose heads bear against a cross-plate 186 spanning the space between the front frame members 12 and bearing against the rear edges thereof. Four cap screws 184 will preferably be provided, being positioned adjacent to and between the members 12, and providing means for firmly and securely anchoring the beam 180 in selected elevation or adjustment. The ability to select the elevation of the beam 180 similarly to the ability to select the elevation of the lower horn 144 provides a wide range of utility for the device and makes it possible to provide for operation thereof while the operator is either seated or standing. The outer or free end of the beam 180 has a cross-plate 188, to which is secured the base plate 190 of a bracket, as by means of cap screws 192. The bracket 190 includes a horizontal upper plate 194 and an upright tubular guide or bearing 196.

A power cylinder 198, such as an air cylinder, is mounted upon the plate 194 with its piston rod 200 projecting downwardly through the bearing 196. At its lower end the piston rod 200 mounts clamp part 202 between which and a complementary clamp part 204 is clamped the lower tubular electrode mounting horn 60. Electrical cable or connector 206 extends between the electrode holder clamp 202 and transformer 138 and water conduits 208 extend from the housing into the rear open end of the horn 60 for the purpose of cooling the electrode 100 associated therewith. It will be apparent that upon energization of the cylinder or power member 198 the upper electrode is raised and lowered relative to the lower electrode as required in the welding operation, similarly to the manner in which conventional press type welding apparatus operates.

While the preferred embodiment of the invention has been illustrated and described, it will be understood that changes in the construction may be made within the scope of the appended claims without departing from the spirit of the invention.

I claim:

1. In an electric welder, a rigid frame, said frame including a base, a pair of spaced front uprights and top and rear members all fixedly interconnected, a plurality of panels removably mounted on said frame at opposite sides thereof and defining a housing, a pair of spaced rigid fittings spanning said front uprights at opposite edges thereof, means drawing said fittings into clamping engagement with said uprights, a lower welding horn extending between said front uprights and fixedly carried by said fittings, a lever pivoted to and positioned between said front uprights, and an upper welding horn carried by said lever.

2. In an electric welder a rigid skeleton frame including a pair of spaced rigid front uprights, panels removably mounted on said frame to define a housing, a pair of rigid centrally apertured fittings spanning said uprights at inner and outer edges thereof, respectively, means drawing said fittings into clamping engagement with said uprights, a lower welding horn mounted in the apertured fittings and between said front uprights, a lever pivoted to and positioned between said uprights and including a clamp portion, and an upper welding horn mounted by said clamp portion.

3. An electric welder comprising a rigid skeleton frame including a pair of spaced rigid front uprights, panels removably mounted on said frame to define a housing, a pair of rigid apertured fittings spanning said uprights at inner and outer edges thereof, respectively, means drawing said fittings into clamping engagement with said uprights, a lower welding horn mounted in the apertured fittings and between said front uprights, a lever pivoted to and positioned between said uprights and including a clamp portion, an upper welding horn mounted by said clamp portion, said frame including a support in said housing offset laterally from said uprights, and a transformer carried by said support in laterally spaced relation to said horns and front uprights.

4. An electric welder comprising a rigid skeleton frame including a pair of spaced rigid front uprights, panels removably mounted on said frame to define a housing, a pair of rigid apertured fittings spanning said uprights at inner and outer edges thereof, respectively, means drawing said fittings into clamping engagement with said uprights, a lower welding horn mounted in the apertured fittings, a lever pivoted to and positioned between said uprights and including a clamp portion, an upper welding horn mounted by said clamp portion, said frame including a support in said housing offset laterally from said uprights, and a transformer carried by said support in laterally spaced relation to the horns, and an electrical system including a pair of water cooled ignitron tubes, means carried by said frame for positioning said tubes one above the other, and coolant lines leading to the bottom of the lower tube and connecting the lower part of the upper tube with the upper part of the lower tube.

5. An electric welder comprising a rigid skeleton frame including a pair of spaced rigid front uprights having inner and outer surfaces narrower than opposed side surfaces thereof, panels removably mounted on said frame to define a housing, a pair of rigid apertured fittings spanning said uprights at inner and outer surfaces thereof, respectively, means drawing said fittings into clamping engagement with said uprights, a lower welding horn mounted in the apertured fittings between said front uprights, a lever pivoted to and positioned between said uprights and including a clamp portion, an upper welding horn mounted by said clamp portion, one of said apertured fittings including a clamp portion, the clamp portions of said fitting and said lever each gripping a selected longitudinal portion of a horn.

6. In an electric welder a rigid skeleton frame, including a pair of spaced rigid front uprights having front and rear edges, the major cross-sectional dimension of said uprights extending between said front and rear edges, a pair of spaced rigid fittings each having an aperture outlined by a collar, means drawing said fittings into clamping engagement with said upright at said front and rear edges, respectively, and with said collars axially aligned, a welding horn supported in said collars and projecting forwardly from said frame, and means carried by one collar for releasably locking said welding horn to said collar in selected endwise adjustment.

7. An electric welder comprising a rigid skeleton frame, including a pair of spaced rigid parallel front upright plates of greater width than thickness positioned with their narrow edges outermost, a pair of rigid fittings spanning said plates at the opposite narrow edges thereof and having central collar portions, an elongated rigid lower welding horn positioned in said collar portions, means drawing said fittings into clamping engagement with said plates, means for releasably locking said horn in selected endwise adjustment in said collar portions, a lever extending between and pivoted to said plates and including an outer clamp portion, and an elongated rigid upper welding horn secured to said lever in selected longitudinal adjustment by said lever clamp portion.

8. An electric welder comprising a rigid frame, a lower horn carried by said frame, a lever pivoted to said frame above said lower horn, a horn carried by said lever, each horn having a longitudinal bore therethrough, an electrode holder carried by each horn, each holder having a stem mounted in the bore of a horn and an end portion projecting from said horn, the end portion of said holder having a bore transverse of said stem and said stem having a pair of passages communicating with said bore, a conduit communicating with each passage, said conduits extending through the bore of a horn, an electrode mounted in one end portion of each bore, a member mounted in said bore and having a passage communicating with one of said stem passages and open at its inner end, the inner end of said member being of reduced dimension to accommodate flow of liquid therearound to the other stem passage, said member having a pair of longitudinally spaced lands fitting snugly in the bore of said holder and circumferentially grooved, and resilient annular sealing members seated in each groove.

9. An electric welder comprising a rigid frame, a lower horn carried by said frame, a lever pivoted to said frame above said lower horn, a horn carried by said lever, each horn having a longitudinal bore therethrough, an electrode holder carried by each horn, each holder having a stem mounted in the bore of a horn and an end portion projecting from said horn, the end portion of said holder having a bore transverse of said stem and said stem having a pair of passages communicating with said bore, a conduit communicating with each passage, said conduits extending through the bore of a horn, an electrode mounted in one end portion of each bore, a member mounted in said bore and having a passage communicating with one of said stem passages and open at its inner end, the inner end of said member being of reduced dimension to accommodate flow of liquid therearound to the other stem passage, said member having a circumferential seal positioned between said stem passages and a second circumferential seal outwardly of the stem passage with which the bore of said member communicates.

10. An electric welder comprising a rigid frame, said frame including a base, a pair of spaced front uprights and top and rear members all fixedly interconnected, a plurality of panels removably mounted on said frame and defining a housing having a front opening between said front frame uprights, upper and lower welding horns, and means carried by said frame for mounting said horns, one of said mounting means supporting a horn and including spaced rigid plates spanning said front frame uprights at opposite edges thereof, and means drawing said plates into clamping engagement with said frame uprights.

References Cited in the file of this patent

UNITED STATES PATENTS

| | | |
|---|---|---|
| 1,292,921 | Thomblade | Jan. 28, 1919 |
| 1,761,421 | Von Henke | June 3, 1930 |
| 2,215,289 | Hensel et al. | Sept. 17, 1940 |